Dec. 23, 1947.   M. W. HUBER   2,433,221
DIAPHRAGM
Filed Aug. 9, 1945
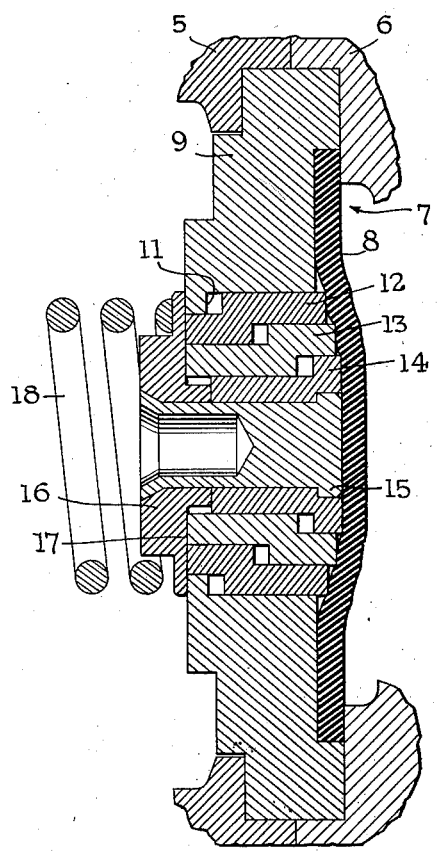
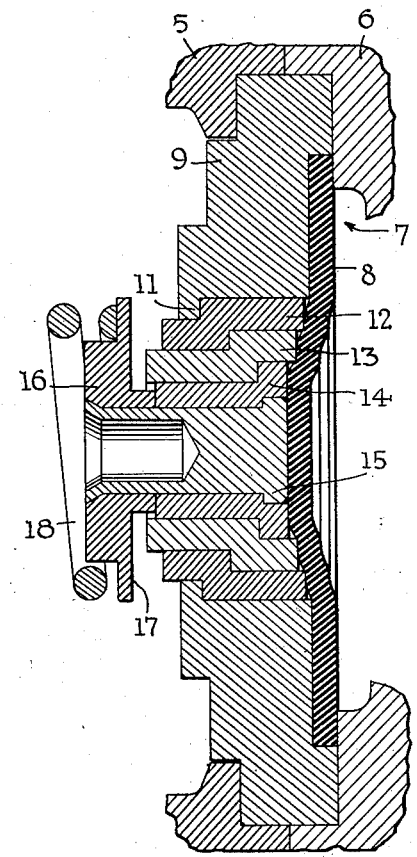
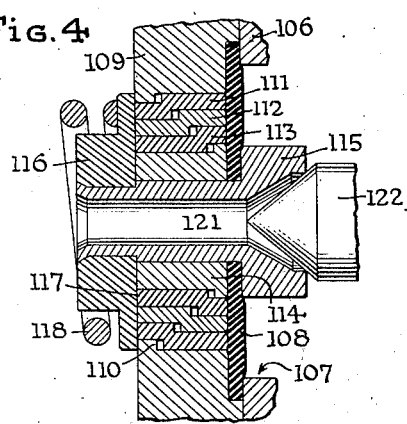
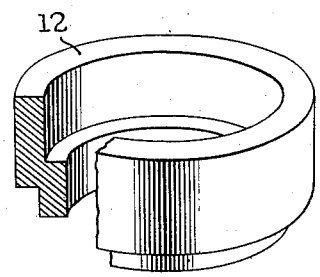
Inventor
Matthew W. Huber
By
Attorneys Patented Dec. 23, 1947

2,433,221

UNITED STATES PATENT OFFICE 2,433,221

DIAPHRAGM

Matthew W. Huber, Watertown, N. Y., assignor to The New York Air Brake Company, a corporation of New Jersey Application August 9, 1945, Serial No. 609,867

1 Claim. (Cl. 137—157)

This invention relates to diaphragms, and particularly to a sustaining means which will adapt a flexible rubber-like diaphragm or other relatively flexible diaphragm for use under high fluid pressures.

The invention makes use of a series of diaphragm-sustaining nested annuli each with a stop for limiting its movement relatively to the support for the margin of the diaphragm, or relatively to the annulus next outward, as the case may be.

The effects are to reduce to a practicable minimum unsustained areas of the diaphragm, and to reduce the effective area of the diaphragm as its displacement progresses.

Two embodiments of the invention will now be described by reference to the accompanying drawing, in which Fig. 1 is an axial section through a diaphragm and the support under low pressure conditions;

Fig. 2 is a similar view showing the positions assumed under high pressure;

Fig. 3 is a perspective view of one of the rings, with a part broken away;

Fig. 4 is a view of a modified construction in which the diaphragm is flat under low pressure conditions. In this view the opportunity has been taken to indicate how a valve may be actuated by the diaphragm.

Since the diaphragm and its sustaining and spring loading means are the significant elements of the invention, details of the housing and the controlled mechanism are not elaborated.

In the drawings 5 and 6 are mating parts of a housing which encloses, among other things, a pressure chamber 7 to the right of the diaphragm 8.

The margin of the diaphragm 8 and a sustaining annulus 9 are clamped between the members 5 and 6. The bore of annulus 9 has a stop shoulder 11 to limit the leftward movement of a first shiftable ring 12 which is formed with internal and external stop shoulders, as shown. There is also a second shiftable ring 13 formed with internal and external stop shoulders and within this is a third shiftable ring 14 which has only an external stop shoulder. As clearly illustrated the internal and external shoulders on rings 12 and 13 are offset in an axial direction. Also the shoulders on successive rings are axially offset so that the rings may nest in the relations illustrated.

To avoid confusing the drawings reference numerals are not applied to the shoulders on rings 12, 13 and 14, but Fig. 3 which illustrates ring 12 makes the form of such parts clear.

The third shiftable ring 14 encircles the shank of a rivet 15 whose head is countersunk into the end of ring 14. The rivet 15 is fixed in a spring seat 16 having a flat face 17 which (when the diaphragm is not under pressure) is in thrust engagement with the left hand ends of rings 9, 12, and 13. The spring seat has a hub engaging the end of ring 14. The spring seat 16 is engaged by the diaphragm-loading spring 18 only a part of which is illustrated.

A comparison of Figs. 1 and 2 will indicate that rings 12 and 13 are graduated in length so that the diaphragm shifts between two positions in which it is reversely flexed. These two views illustrate the diaphragm as it appears at the extreme limits of its reverse movements. In Fig. 1, which shows the low pressure limiting position the surface 17 engages the rings 9, 12 and 13 and determines their positions. Here the full area of the diaphragm is effective. As the diaphragm 8 is forced to the left by rising pressure the rings 12, 13, and 14 will successively be arrested by their shoulders until the high pressure limiting position of Fig. 2 is reached. This action is attended by a reduction of the effective area of the diaphragm. When ring 12 is arrested it renders ineffective the annular area of the diaphragm in contact with the ring. Arrest of ring 13 has a similar effect, and so on.

If the low pressure configuration of the diaphragm is to be flat, then the rings can be differently proportioned to meet this requirement.

Such a construction is shown in Fig. 4. Here the diaphragm 108 is clamped at its margin between annulus 109 and housing part 106. Annulus 109 is internally shouldered at 110, and there are four shouldered rings 111, 112, 113 and 114. The central rivet 115 clamps the center of the diaphragm 108 to ring 114 and to spring seat 116, which sustains loading spring 118 and has a flat surface 117 which engages annulus 109 and the left hand ends of rings 111 to 114, inclusive, in the low pressure position indicated in the drawing.

In Fig. 4 rivet 115 is shown with an axial port 121 controlled by a needle valve 122. The purpose is merely to indicate the general applicability of the invention to diaphragms with and without valves. The diaphragm is subject to pressure in chamber 107.

Two specific arrangements have been illustrated in detail and others within the scope of the claim are obviously possible.

What is claimed is:

The combination of a flexible diaphragm; a fixed annular support for the periphery of the diaphragm; said support having a guideway formed with an annular stop; a hub against which the central area of the diaphragm reacts, said hub having an encircling stop shoulder; a series of nested rings having internal and external stop shoulders, the nest of rings being interposed between said hub and annular support in guiding relation therewith, the various stop shoulders serving to limit motion so that successive rings counted inward are permitted increments of axial motion and the hub is permitted maximum motion; a spring seat arranged to engage said annular support, said nested rings and said hub when the diaphragm is in its normal position under low pressure; and yielding loading means arranged to react on said spring seat.

MATTHEW W. HUBER.

REFERENCES CITED

The following references are of record in the file of this patent:

UNITED STATES PATENTS

| Number | Name | Date |
|---|---|---|
| 1,132,424 | Arcus | Mar. 16, 1915 |
| 1,819,947 | de Lavaud | Aug. 18, 1931 |